(12) United States Patent
Gaschler et al.

(10) Patent No.: US 11,242,424 B2
(45) Date of Patent: Feb. 8, 2022

(54) AQUEOUS BINDERS

(71) Applicant: BASF SE, Ludwigshafen am Rhein (DE)

(72) Inventors: Wolfgang Gaschler, Ludwigshafen (DE); Sebastian Enck, Jakarta (ID)

(73) Assignee: BASF SE

( * ) Notice: Subject to any disclaimer, the term of this patent is extended or adjusted under 35 U.S.C. 154(b) by 0 days.

(21) Appl. No.: 16/980,732

(22) PCT Filed: Mar. 13, 2019

(86) PCT No.: PCT/EP2019/056238
§ 371 (c)(1),
(2) Date: Sep. 14, 2020

(87) PCT Pub. No.: WO2019/175212
PCT Pub. Date: Sep. 19, 2019

(65) Prior Publication Data
US 2021/0009734 A1  Jan. 14, 2021

(30) Foreign Application Priority Data
Mar. 15, 2018 (EP) .................................. 18161901

(51) Int. Cl.
| | | |
|---|---|---|
| C08F 220/14 | (2006.01) | |
| C08F 2/22 | (2006.01) | |
| C08K 11/00 | (2006.01) | |
| C09D 133/12 | (2006.01) | |

(52) U.S. Cl.
CPC .............. *C08F 220/14* (2013.01); *C08F 2/22* (2013.01); *C08K 11/00* (2013.01); *C09D 133/12* (2013.01)

(58) Field of Classification Search
CPC .......... C08F 220/14; C08F 2/22; C08K 11/00; C09D 133/12
USPC ........................................................ 524/562
See application file for complete search history.

(56) References Cited

U.S. PATENT DOCUMENTS

| | | | |
|---|---|---|---|
| 4,269,749 A | 5/1981 | Marriott et al. | |
| 4,414,370 A | 11/1983 | Hamielec et al. | |
| 4,529,787 A | 7/1985 | Schmidt et al. | |
| 4,546,160 A | 10/1985 | Brand et al. | |
| 9,238,699 B2 | 1/2016 | Klots et al. | |
| 2012/0252972 A1 | 10/2012 | Balk et al. | |

FOREIGN PATENT DOCUMENTS

| | | | |
|---|---|---|---|
| DE | 40 03 422 A1 | 8/1991 | |
| DE | 42 13 965 A1 | 11/1993 | |
| DE | 196 24 299 A1 | 1/1997 | |
| DE | 196 21 027 A1 | 11/1997 | |
| DE | 197 41 184 A1 | 3/1999 | |
| DE | 197 41 187 A1 | 3/1999 | |
| DE | 198 05 122 A1 | 4/1999 | |
| DE | 198 28 183 A1 | 12/1999 | |
| DE | 198 39 199 A1 | 3/2000 | |
| DE | 198 40 586 A1 | 3/2000 | |
| DE | 198 47 115 C1 | 5/2000 | |
| EP | 0 040 419 B1 | 7/1985 | |
| EP | 0 567 812 A1 | 11/1993 | |
| EP | 0 614 922 A2 | 9/1994 | |
| EP | 0 771 328 A1 | 5/1997 | |
| EP | 1328553 A2 * | 7/2003 | ................ C08F 2/00 |
| EP | 1 328 553 B1 | 11/2006 | |
| WO | WO 95/33775 A1 | 12/1995 | |
| WO | WO 02/055563 A2 | 7/2002 | |
| WO | WO 2009/135812 A1 | 11/2009 | |
| WO | WO 2017/017090 A1 | 2/2017 | |
| WO | WO 2017/140520 A1 | 8/2017 | |

OTHER PUBLICATIONS

International Search Report dated May 27, 2019 in PCT/EP2019/056238 filed on Mar. 13, 2019, 2 pages.

* cited by examiner

*Primary Examiner* — Kelechi C Egwim

(74) *Attorney, Agent, or Firm* — Faegre Drinker Biddle & Reath LLP

(57) ABSTRACT

A process for preparing an aqueous polymer dispersion, the process including forming a copolymer A from at least one α,β-monoethylenically unsaturated $C_3$ to $C_6$ monocarboxylic acid (monomers A1) and at least one other monoethylenically unsaturated compound (monomers A2); reacting the copolymer A with a metal compound M in an aqueous medium; and conducting free-radical polymerization of at least one ethylenically unsaturated compound (monomer P) in the presence of the copolymer A in an aqueous medium.

15 Claims, No Drawings

AQUEOUS BINDERS

The present invention provides a process for preparing an aqueous polymer dispersion through free-radical-initiated emulsion polymerization, wherein at least one ethylenically unsaturated compound (monomer P) undergoes free-radical polymerization in the presence of a copolymer A in an aqueous medium, wherein
a) the copolymer A is formed in copolymerized form from

| | |
|---|---|
| ≥10% and ≤50% | by weight of at least one α,β-monoethylenically unsaturated $C_3$ to $C_6$ monocarboxylic acid (monomers A1), |
| ≥50% and ≤90% | by weight of at least one other monoethylenically unsaturated compound (monomers A2), | wherein the amounts of monomers A1 and A2 add up to 100% by weight (total amount of monomers A) and wherein the copolymer A has a weight-average molecular weight in the range ≥5000 and ≤20 000 g/mol, the type and amounts of monomers A1 and A2 are chosen such that the copolymer A obtained has a glass transition temperature Tg measured according to DIN EN ISO 11357-2 (2013-09) in the range ≥70° C. and wherein before the addition and the free-radical polymerization of the at least one monomer P, the copolymer A is reacted in an aqueous medium with a metal compound M, selected from the group comprising oxides, hydroxides, carbonates or hydrogen carbonates of magnesium, calcium or zinc, and a base B that differs from the metal compound M, such that ≥50 mol % of the carboxyl groups present in copolymer A have been neutralized by the base B, and the amount of the metal compound M is 0.01% to 5% by weight based on the amount of copolymer A, b) the type and amount of the at least one monomer P are chosen such that the dispersion polymer P obtained has a glass transition temperature Tg measured in accordance with DIN EN ISO 11357-2 (2013-09) in the range ≥−30 and ≤90° C., and wherein c) the ratio of the amounts by weight of copolymer A to the at least one monomer P used to prepare the dispersion polymer P is in the range ≥15 and ≤60 to ≥40 and ≤85.

The present invention further provides the aqueous polymer dispersions themselves that are obtainable by the process according to the invention, the polymer powders obtainable therefrom, the use of the aqueous polymer dispersions and the polymer powders in a wide diversity of fields of use, and aqueous paint and coating formulations that comprise the cited aqueous polymer dispersions or polymer powders.

To improve the physical and/or chemical properties of the aqueous compositions or of the polymer films obtainable therefrom, polyvalent metal cations are commonly added to acid-group-containing polymers or copolymers present in aqueous media. For example, polyvalent metal cations can be added to aqueous polymer systems in which the polymers or copolymers contain acid groups such as carboxylic acid, sulfonic acid or phosphoric acid groups, with the result that the corresponding acid groups are completely or partially neutralized. The ionic bonds thus obtained can result in crosslinking of the polymer or copolymer chains during film formation. However, a problem with the addition of polyvalent metal cations to aqueous polymer systems in which the polymers or copolymers contain acid groups is that the aqueous polymer systems can be destabilized by the polyvalent metal cations, resulting in an undesired formation of gel particles that interferes with film formation.

In a procedure disclosed in WO 2002/055563, aqueous polymer dispersions comprising metal cations are prepared by initially charging the total amount of the metal cations and at least a partial amount of an acid-group-containing ethylenically unsaturated monomer in a dispersant-containing aqueous medium with the formation of a complex, and then metering in under polymerization conditions the remaining amount of the acid-group-containing ethylenically unsaturated monomer together with the total amount of the non-acid-group-containing ethylenically unsaturated monomers. However, a disadvantage of the disclosed procedure is that large amounts of dispersant are required and the resulting aqueous polymer dispersions contain undesirable gel particles (coagulate).

It was therefore an object of the present invention to provide an improved process for preparing aqueous polymer dispersions comprising metal cations that is easy to carry out and results in finely divided aqueous polymer dispersions that have relatively small coagulate contents or contain none at all, have high transparency in use when wet, and allow resistant coatings, particularly against staining.

The object was achieved by providing the process defined in the introduction and the aqueous polymer dispersions obtainable therefrom.

The copolymer A used according to the invention is formed in copolymerized form from

| | |
|---|---|
| ≥10% and ≤50% | by weight of at least one α,β-monoethylenically unsaturated $C_3$ to $C_6$ monocarboxylic acid (monomers A1) and |
| ≥50% and ≤90% | by weight of at least one other monoethylenically unsaturated compound (monomers A2), | wherein the amounts of monomers A1 and A2 add up to 100% by weight (total amount of monomers A).

The monomers A1 are α,β-monoethylenically unsaturated $C_3$ to $C_6$ monocarboxylic acids, preferably $C_3$ or $C_4$ monocarboxylic acids, and their water-soluble salts obtained by complete or partial neutralization with a base B. Examples include acrylic acid, methacrylic acid, ethylacrylic acid, allylacetic acid, crotonic acid or vinylacetic acid. The monomer A1 is preferably selected from the group comprising acrylic acid, methacrylic acid and/or crotonic acid. It is however particularly advantageous when the copolymer A comprises in copolymerized form acrylic acid and/or methacrylic acid as monomers A1.

Suitable monomers A2 are in principle all ethylenically unsaturated monomers that differ from the monomers A1 and are copolymerizable therewith.

However, the copolymer A advantageously comprises in copolymerized form as monomers A2,

| | |
|---|---|
| ≥25% and ≤90% | by weight of at least one monoethylenically unsaturated aromatic compound (monomers A2-1) and |
| ≥0% and ≤65% | by weight of at least one other monoethylenically unsaturated compound that differs from monomers A1 and A2-1 (monomers A2-2), | based on the total amount of monomers A, wherein the amounts of monomers A2-1 and A2-2 add up to a minimum of 50% by weight and a maximum of 90% by weight of the total amount of monomers A.

Suitable monomers A2-1 are in principle all monoethylenically unsaturated aromatic compounds, for example styrene, α-methylstyrene, o-chlorostyrene and o-, m- or p-vinyltoluene. It is particularly advantageous when the copolymer A comprises in copolymerized form styrene and/or α-methylstyrene as monomers A2-1.

Suitable monomers A2-2 are in principle all other monoethylenically unsaturated compounds that differ from monomers A1 and A2-1. Examples of monomers A2-2 include vinyl halides such as vinyl chloride or vinylidene chloride, esters of vinyl alcohol and monocarboxylic acids having 1 to 18 carbon atoms, preferably 2 to 12 carbon atoms, such as vinyl acetate, vinyl propionate, vinyl n-butyrate, vinyl laurate, and vinyl stearate, $C_1$ to $C_{12}$ alkyl vinyl ethers, such as methyl vinyl ether, ethyl vinyl ether, n-propyl vinyl ether, n-butyl vinyl ether, n-pentyl vinyl ether, n-hexyl vinyl ether, esters of α,β-monoethylenically unsaturated mono- and dicarboxylic acids having preferably 3 to 6 carbon atoms, such as in particular acrylic acid, methacrylic acid, maleic acid, fumaric acid and itaconic acid, with alkanols generally having 1 to 12, preferably 1 to 8, and in particular 1 to 4 carbon atoms, such as in particular the methyl, ethyl, n-butyl, isobutyl, pentyl, hexyl, heptyl, octyl, nonyl, decyl and 2-ethylhexyl esters of acrylic acid and of methacrylic acid, the dimethyl or di-n-butyl esters of fumaric acid and of maleic acid, nitriles of α,β-monoethylenically unsaturated carboxylic acids, such as acrylonitrile, methacrylonitrile, fumaronitrile, maleonitrile, and also $C_4$ to $C_8$ conjugated dienes such as 1,3-butadiene (butadiene). The abovementioned monomers generally account for ≥90% by weight, preferably ≥95% by weight and more preferably ≥98% by weight, of the total amount of all monomers A2-2 and are thus the principal monomers A2-2. However, it is preferable according to the invention when the copolymer A comprises in copolymerized form, as the principal monomer A2-2, at least one ester of acrylic acid or methacrylic acid with a $C_1$ to $C_{12}$ alcohol, in particular methyl acrylate, ethyl acrylate, n-butyl acrylate, 2-ethylhexyl acrylate and/or methyl methacrylate, but preferably methyl methacrylate, n-butyl acrylate and/or 2-ethylhexyl acrylate.

Also suitable as monomers A2-2 in lesser amounts are ethylenically unsaturated monomers that contain either at least one sulfonic acid group and/or the corresponding anion thereof or at least one amino, amido, ureido or N-heterocyclic group and/or the nitrogen-protonated or nitrogen-alkylated ammonium derivatives thereof. Examples include acrylamide and methacrylamide, and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate. The abovementioned monomers A2-2 generally comprise a proportion of ≤10% by weight, preferably ≤5% by weight, and in particular ≤2% by weight, in each case based on the total amount of copolymerized monomers A2-2. However, it is advantageous when no such ethylenically unsaturated monomers A2-2 are incorporated.

Monomers A2-2 that typically increase the internal strength of the films formed by a polymer matrix normally have at least one epoxy group, at least one carbonyl group, or at least two non-conjugated ethylenically unsaturated double bonds. Examples thereof include monomers having two vinyl radicals, monomers having two vinylidene radicals, and monomers having two alkenyl radicals. Particularly advantageous here are diesters of dihydric alcohols with α,β-monoethylenically unsaturated monocarboxylic acids, preference among these being given to acrylic and methacrylic acid. Examples of such monomers comprising two non-conjugated ethylenically unsaturated double bonds include alkylene glycol diacrylates and alkylene glycol dimethacrylates, such as ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, or triallyl isocyanurate. The abovementioned monomers A2-2 generally comprise a proportion of ≤10% by weight, preferably ≤5% by weight, and in particular ≤2% by weight, in each case based on the total amount of copolymerized monomers A2-2. However, it is advantageous when no such ethylenically unsaturated monomers A2-2 are incorporated.

It is particularly advantageous when the copolymer A comprises in copolymerized form, as monomers A2-2, methyl methacrylate, n-butyl acrylate and/or 2-ethylhexyl acrylate, and in particular methyl methacrylate and n-butyl acrylate.

The copolymer A thus advantageously comprises in copolymerized form acrylic acid and/or methacrylic acid as monomers A1, styrene and/or α-methylstyrene as monomers A2-1, and methyl methacrylate, n-butyl acrylate and/or 2-ethylhexyl acrylate as monomers A2-2.

In accordance with the invention, the copolymer A advantageously comprises in copolymerized form ≥10% and ≤45% by weight of monomers A1, ≥25% and ≤65% by weight of monomers A2-1 and ≥0% and ≤65% by weight of monomers A2-2.

It is advantageous in accordance with the invention when the copolymer A is formed in copolymerized form from

| | |
|---|---|
| ≥10% and ≤45% | by weight of acrylic acid, |
| ≥25% and ≤65% | by weight of styrene, |
| ≥0% and ≤40% | by weight of α-methylstyrene, and |
| ≥0% and ≤65% | by weight of methyl methacrylate, n-butyl acrylate and/or 2-ethylhexyl acrylate. |

In accordance with the invention, the type and amounts of the monomers A1 and A2 (or A2-1 and A2-2) in the preparation of the copolymer A are chosen such that the resulting copolymer A has a glass transition temperature Tg measured according to DIN EN ISO 11357-2 (2013-09) in the range ≥70° C., advantageously in the range ≥80° C. and ≤150° C. or the range ≥90° C. and ≤130° C.

It is also important in accordance with the invention that the copolymer A has a weight-average molecular weight in the range ≥5000 and ≤20 000 g/mol and especially advantageously in the range ≥5500 and ≤18 000 g/mol. In the context of this document, the determination of the weight-average molecular weight is to be carried out by gel-permeation chromatography using defined polystyrene standards dissolved in tetrahydrofuran for calibration.

The preparation of the copolymer A is familiar to those skilled in the art and is carried out for example by free-radical-initiated solution, dispersion or bulk polymerization of the appropriate amounts of ethylenically unsaturated monomers A1 and A2 using a free-radical-initiating compound (free-radical initiator), such as are disclosed for example in WO 2017/017090, page 12, lines 1-25, and an appropriate amount of free radical chain-transfer compounds (chain-transfer agents), such as are disclosed for example in WO 2017/017090, page 13, line 31 to page 14 line 12, or by free-radical-initiated solution polymerization or bulk polymerization at temperatures ≥150° C. It is advantageous when the free-radical-initiated solution polymerization or bulk polymerization is carried out at these elevated temperatures in a tubular reactor, a continuously operated stirred-tank reactor or in a continuously operated stirred-tank reactor cascade (see e.g. U.S. Pat. Nos. 4,414,370, 4,529,787, 4,546,160, 9,238,699). However, it is preferable when the preparation of the copolymer A is carried out in bulk or optionally in the presence of a solvent by polymerization of the monomers A1 and A2 at a temperature ≥160° C. and ≤310° C., particularly advantageously at a temperature in the range ≥180° C. and ≤250° C. using at least one continuously operated stirred-tank reactor. If solvents are used in this high temperature operating mode, the chosen solvents are ones that are inert at the reaction temperature, for example xylene, toluene, ethylbenzene, aromatic mixtures (for example Aromatic-100°, Aromatic-150° or Aromatic-200®, obtainable from Exxon), acetone, methyl ethyl ketone, N-methyl pyrrolidone and/or Carbitol, the amount of which is generally ≤40% by weight, often ≥5% and ≤15% by weight, based on the total amount of monomer A. The polymerization is advantageously carried out under pressure conditions, at 1 to 10 bar (overpressure) and an average residence time of ≥2 and ≤30 minutes, with preference given to an average residence time of ≥10 and ≤25 minutes. It is particularly advantageous when the polymerization mixture discharged from the at least one continuously operated stirred-tank reactor is immediately passed through a likewise continuously operated falling-film evaporator in which any unconverted monomers A1 and A2 and any solvent present are distilled off, the resulting copolymer A commonly being obtained in the form of finely divided flakes. Corresponding products are marketed by BASF SE under the trade name Joncryl®.

According to the invention, before the addition and the free-radical polymerization of the at least one monomer P, the copolymer A is reacted in an aqueous medium with a metal compound M, selected from the group comprising oxides, hydroxides, carbonates or hydrogen carbonates of magnesium, calcium or zinc, and a base B that differs from the metal compound M such that ≥50 mol-% of the carboxyl groups present in the copolymer A have been neutralized by the base B and the amount of the metal compound M is 0.01% to 5% by weight based on the amount of copolymer A.

According to the invention, the metal compound M is selected from the group comprising oxides, hydroxides, carbonates or hydrogen carbonates of magnesium, calcium or zinc, such as magnesium oxide [MgO], magnesium hydroxide [Mg(OH)$_2$], magnesium carbonate [MgCO$_3$], magnesium hydrogen carbonate [Mg(HCO$_3$)$_2$], calcium oxide [CaO], calcium hydroxide [Ca(OH)$_2$], calcium carbonate [CaCO$_3$], calcium hydrogen carbonate [Ca(HCO$_3$)$_2$], zinc oxide [ZnO], zinc hydroxide [Zn(OH)$_2$], zinc carbonate [ZnCO$_3$], zinc hydrogen carbonate [Zn(HCO$_3$)$_2$], and hydrated compounds that may optionally be correspondingly present. Preference is given to using calcium hydroxide, calcium oxide, magnesium carbonate and/or zinc oxide, with calcium hydroxide however particularly preferred.

The amount of metal compound M here is 0.01% to 5% by weight, advantageously 0.05% to 2.5% by weight, and particularly advantageously 0.1% to 1.0% by weight, in each case based on the amount of copolymer A.

The base used may be any inorganic or organic compound having a pKa >5 that differs from the at least one metal compound M, such as alkali metal hydroxides, carbonates or hydrogen carbonates, such as in particular sodium hydroxide [NaOH] or potassium hydroxide [KOH], sodium hydrogen carbonate [NaHCO$_3$] or potassium hydrogen carbonate [KHCO$_3$], sodium carbonate [Na$_2$CO$_3$] or potassium carbonate [K$_2$CO$_3$], ammonium hydroxide [NH$_4$OH], ammonium carbonate [(NH$_4$)$_2$CO$_3$] or ammonium hydrogen carbonate [NH$_4$HCO$_3$], and hydrated compounds that may optionally be correspondingly present, primary, secondary or tertiary organic amines, such as methylamine, ethylamine, propyl-1-amine, propyl-2-amine, n-butyl-1-amine, n-butyl-2-amine, 2-methylpropyl-1-amine, 2-methylpropyl-2-amine, etc., dimethylamine, diethylamine, di-n-propylamine, diisopropylamine, di-n-butylamine, di-2-methylpropylamine, etc., trimethylamine, triethylamine, tri-n-propylamine, triisopropylamine, tri-n-butylamine, tri-2-methylpropylamine etc., but also mixed amines such as N-methyl-N-ethylamine, N,N-dimethyl-N-ethylamine, etc. It is advantageous to use ammonium hydroxide and/or an organic amine. However, it is especially advantageous when neutralization of the carboxyl groups of the copolymer A is carried out using bases having a boiling point of ≤110° C., advantageously ≤50° C., and particularly advantageously ≤0° C. at a pressure of 1.013 bar (absolute). Preference is however given to using in particular ammonium hydroxide, which in an aqueous medium is—like ammonium carbonate and ammonium hydrogen carbonate—in equilibrium with ammonia (in hydrated form). Ammonia has a boiling point of ≤0° C. at a pressure of 1.013 bar (absolute).

In accordance with the invention, the amount of base B is such that ≥50 mol % and ≤150 mol %, advantageously ≥60 mol % and ≤120 mol %, and more advantageously ≥70 mol % and ≤100 mol % of the carboxyl groups present in the copolymer A are neutralized by base B.

Given that the metal compound M also has basic properties and can contribute to the neutralization of the carboxyl groups, the phrase "are neutralized by base B" in the context of this document is therefore intended to mean that the amount of base B added is such that it is sufficient for neutralization of ≥50 mol % and ≤150 mol %, advantageously ≥60 mol and ≤120 mol %, and more advantageously ≥70 mol % and ≤100 mol % of the carboxyl groups present in copolymer A.

In one embodiment, the addition of the at least one monomer P is according to the process preceded in a separate process step in a reaction vessel by the following steps:
water, in particular deionized water, the total amount of the at least one metal compound M, the total amount of copolymer A, advantageously in the form of powder or flakes, and the total amount of base B, are initially charged at room temperature (20 to 25° C.) with stirring, then
the reaction vessel is optionally inertized with nitrogen, then the aqueous copolymer A/metal compound M/base B mixture is optionally stirred for a period at room temperature and then heated to a temperature ≥50 and ≤90° C. while being stirred, then
the resulting reaction mixture is stirred at this temperature until the copolymer A has at least partially, advantageously completely, dissolved, and then the resulting reaction mixture is cooled to room temperature and optionally filtered through a 125 μm filter.

The inventive free-radical-initiated emulsion polymerization of the at least one monomer P is carried out in an aqueous medium in the presence of a copolymer A that has been reacted with a metal compound M and a base B in an aqueous medium, the type and amount of the at least one monomer P being chosen such that the dispersion polymer P obtained has a glass transition temperature Tg, measured in accordance with DIN EN ISO 11357-2 (2013-09), in the range ≥−30 and ≤90° C.

The performance of free-radical-initiated emulsion polymerizations of ethylenically unsaturated compounds (monomers) in an aqueous medium has already been widely described and is therefore well known to those skilled in the art [see e.g. "Emulsionspolymerisation" [Emulsion polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, "Chemie in unserer Zeit" [Chemistry in our time] 24, pages 135-142 (1990); Emulsion Polymerisation, Interscience Publishers, New York (1965); DE-A 40 03 422 and "Dispersionen synthetischer Hochpolymerer" [Dispersions of Synthetic High Polymers], F. Hölscher, Springer-Verlag, Berlin (1969)]. The free-radical-initiated aqueous emulsion polymerization is typically carried out by dispersing the monomers in an aqueous medium, generally by means of dispersing aids such as emulsifiers and/or protective colloids, and polymerizing them using at least one water-soluble free-radical polymerization initiator. Commonly, the residual contents of unreacted monomers in the resulting aqueous polymer dispersions are reduced using chemical and/or physical methods likewise known to those skilled in the art [see for example EP-A 771328, DE-A 19624299, DE-A 19621027, DE-A 19741184, DE-A 19741187, DE-A 19805122, DE-A 19828183, DE-A 19839199, DE-A 19840586, and 19847115], the polymer solids content is adjusted to a desired value by diluting or concentrating, or further customary added substances, for example foam- or viscosity-modifying additives, are added to the aqueous polymer dispersion. The preparation of an aqueous polymer dispersion of the invention differs from this general procedure only in that the type and amount of the monomers are chosen such that the dispersion polymers P formed have a glass transition temperature Tg in the range ≥−30 and ≤90° C. and the emulsion polymerization takes place in the presence of copolymer A that has been reacted with the metal compound M and the base B, with dispersing aids such as emulsifiers and/or protective colloids not normally necessary. It is thereby understood that, for the preparation of the dispersion polymers P, the scope of the present document is also intended to include the seed, staged and gradient modes of polymerization familiar to those skilled in the art. If staged polymers are being prepared, then according to the invention at least the polymer from one stage has a glass transition temperature Tg in the range ≥−30 and ≤90° C.

Suitable monomers P are in particular monomers capable of undergoing free-radical polymerization in a simple manner, for example ethylene, vinyl-substituted aromatic monomers such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, for example vinyl acetate, vinyl propionate, vinyl n-butyrate, vinyl laurate, and vinyl stearate, esters derived from α,β-monoethylenically unsaturated mono- and dicarboxylic acids having preferably 3 to 6 carbon atoms, such as in particular acrylic acid, methacrylic acid, maleic acid, fumaric acid, and itaconic acid, with alkanols generally having 1 to 12, preferably 1 to 8, and in particular 1 to 4, carbon atoms, such as in particular the methyl, ethyl, n-butyl, isobutyl, pentyl, hexyl, heptyl, octyl, nonyl, decyl, and 2-ethylhexyl esters of acrylic acid and of methacrylic acid, the dimethyl or di-n-butyl esters of fumaric acid and of maleic acid, nitriles of α,β-monoethylenically unsaturated carboxylic acids, for example acrylonitrile, methacrylonitrile, fumaronitrile, maleonitrile, and also $C_4$ to $C_8$ conjugated dienes such as 1,3-butadiene and isoprene. The recited monomers P are generally the main monomers, which together form a proportion of ≥50% by weight, preferably ≥80% by weight and very preferably ≥90% by weight, based on the amount of all ethylenically unsaturated compounds used to prepare the dispersion polymer P (total amount of monomers P). The solubility of these monomers P in water under standard conditions [20° C., 1 atm (=1.013 bar absolute)] is very generally only moderate to low.

Monomers P that have enhanced water solubility under the abovementioned conditions are those that contain either at least one acid group and/or anion corresponding thereto or at least one amino, amido, ureido, or N-heterocyclic group and/or nitrogen-protonated or nitrogen-alkylated ammonium derivative thereof. Examples include α,β-monoethylenically unsaturated mono- and dicarboxylic acids and amides thereof, e.g. acrylic acid, methacrylic acid, maleic acid, fumaric acid, itaconic acid, acrylamide, and methacrylamide, and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide and 2-(1-imidazolin-2-onyl)ethyl methacrylate. The abovementioned monomers P are normally present solely as modifying monomers in amounts of ≤10% by weight and preferably ≤5% by weight, based on the total amount of monomers P.

Monomers P that typically increase the internal strength of the filmed polymer matrix normally have at least one epoxy, hydroxyl, N-methylol or carbonyl group, or at least two non-conjugated ethylenically unsaturated double bonds. Examples thereof include monomers having two vinyl radicals, monomers having two vinylidene radicals, and monomers having two alkenyl radicals. Particularly advantageous here are diesters of dihydric alcohols with α,β-monoethylenically unsaturated monocarboxylic acids, preference among these being given to acrylic and methacrylic acid. Examples of such monomers having two non-conjugated ethylenically unsaturated double bonds are alkylene glycol diacrylates and alkylene glycol dimethacrylates, such as ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, or triallyl isocyanurate. Other materials of particular significance in this context are $C_1$ to $C_8$ hydroxyalkyl esters of methacrylic and of acrylic acid, for example n-hydroxyethyl, n-hydroxypropyl, or n-hydroxybutyl acrylate and the corresponding methacrylate, and also compounds such as diacetoneacrylamide and acetylacetoxyethyl acrylate and the corresponding methacrylate. Commonly, the abovementioned monomers P are used in amounts of ≤5% by weight, but preferably in amounts of ≤3% by weight, in each case based on the total amount of monomers P.

In one embodiment of the invention, the dispersion polymer P is prepared using

| | |
|---|---|
| ≥50% and ≤99.9% | by weight of esters of acrylic and/or methacrylic acid with alkanols having 1 to 12 carbon atoms and/or styrene |
| or | |
| ≥40% and ≤99.9% | by weight of styrene and/or butadiene, |
| or | |
| ≥50% and ≤99.9% | by weight of vinyl chloride and/or vinylidene chloride, |
| or | |
| ≥40% and ≤99.9% | by weight of vinyl acetate, vinyl propionate, and/or ethylene. |

Commonly, the dispersion polymers P are according to the invention prepared using monomer mixtures comprising

| | |
|---|---|
| ≥0.1% and ≤5% | by weight of at least one α,β-monoethylenically unsaturated mono- and/or dicarboxylic acid having 3 to 6 carbon atoms and/or the amide thereof, and |
| ≥50% and ≤99.9% | by weight of at least one ester of acrylic and/or methacrylic acid with alkanols having 1 to 12 carbon atoms and/or styrene |
| or | |
| ≥0.1% and ≤5% | by weight of at least one α,β-monoethylenically unsaturated mono- and/or dicarboxylic acid having 3 to 6 carbon atoms and/or the amide thereof, and |
| ≥40% and ≤99.9% | by weight of styrene and/or butadiene, |
| or | |
| ≥0.1% and ≤5% | by weight of at least one α,β-monoethylenically unsaturated mono- and/or dicarboxylic acid having 3 to 6 carbon atoms and/or the amide thereof, and |
| ≥50% and ≤99.9% | by weight of vinyl chloride and/or vinylidene chloride, |
| or | |
| ≥0.1% and ≤5% | by weight of at least one α,β-monoethylenically unsaturated mono- and/or dicarboxylic acid having 3 to 6 carbon atoms and/or the amide thereof, and |
| ≥40% and ≤99.9% | by weight of vinyl acetate, vinyl propionate, and/or ethylene. |

It is however advantageous in accordance with the invention when no α,β-monoethylenically unsaturated mono- and/or dicarboxylic acid having 3 to 6 carbon atoms and/or the amide thereof is used as monomer P. In a preferred embodiment, only mixtures of at least one ester of acrylic and/or methacrylic acid with alkanols having 1 to 12 carbon atoms and styrene are used as monomers P.

The monomers P according to the invention may be metered into the aqueous medium under polymerization conditions individually or in a mixture, in a continuous or batchwise process, and in neat form or as an aqueous monomer emulsion. It is advantageous when the monomers P are added to the aqueous polymerization medium in neat form as a monomer mixture in a continuous process.

The free-radical-initiated aqueous emulsion polymerization for the preparation of the dispersion polymer P is generally carried out in the presence of 0.1% to 5% by weight, preferably 0.1% to 4% by weight and in particular 0.1% to 3% by weight, in each case based on the total amount of monomers P, of a free-radical polymerization initiator (free-radical initiator). Suitable free-radical initiators are all initiators that are capable of initiating a free-radical aqueous emulsion polymerization. These may in principle be peroxides or they may be azo compounds. Redox initiator systems are of course also suitable. Peroxides used may in principle be inorganic peroxides, such as hydrogen peroxide or peroxodisulfates, such as the monoalkali metal or dialkali metal or ammonium salts of peroxodisulfuric acid, for example the monosodium and disodium, monopotassium and dipotassium or ammonium salts thereof, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl peroxide or di-cumyl peroxide. Azo compounds used are primarily 2,2'-azobis(isobutyronitrile), 2,2'-azobis(2,4-dimethylvaleronitrile), and 2,2'-azobis(amidinopropyl) dihydrochloride (AIBA, corresponds to V50 from Wako Chemicals). It is of course also possible to use so-called redox initiator systems as free-radical initiators. Suitable oxidants for redox initiator systems are primarily the peroxides mentioned above. Corresponding reductants that may be used are sulfur compounds in a low oxidation state such as alkali metal sulfites, for example potassium and/or sodium sulfite, alkali metal hydrogen sulfites, for example potassium and/or sodium hydrogen sulfite, alkali metabisulfites, for example potassium and/or sodium metabisulfite, formaldehyde sulfoxylates, for example potassium and/or sodium formaldehyde sulfoxylate, alkali metal salts, specifically potassium and/or sodium salts of aliphatic sulfinic acids and alkali metal hydrogen sulfides, for example potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone.

Optionally, dispersing aids may additionally be used in the preparation of the dispersion polymers P by free-radical-initiated aqueous emulsion polymerization; these usually keep both the monomer droplets and polymer particles dispersed in the aqueous phase, thereby ensuring the stability of the aqueous dispersions of the dispersion polymers produced. These may be protective colloids typically used in the performance of free-radical aqueous emulsion polymerizations or they may be emulsifiers.

Examples of protective colloids that are in principle suitable are polyvinyl alcohols, cellulose derivatives or copolymers containing vinyl pyrrolidone. A detailed description of further suitable protective colloids is given in Houben-Weyl, Methoden der organischen Chemie [Methods of Organic Chemistry], vol. XIV/1, Makromolekulare Stoffe [Macromolecular substances], pages 411-420, Georg-Thieme-Verlag, Stuttgart, 1961. It is of course also possible to use mixtures of emulsifiers and/or protective colloids. Dispersing aids used are preferably exclusively emulsifiers having relative molecular weights that are normally below 1000, in contrast to the protective colloids. They may be anionic, cationic, or nonionic. When mixtures of surface-active substances are used, the individual components must of course be compatible with one another; in case of doubt, this may be checked on the basis of a few preliminary experiments. Anionic emulsifiers are generally compatible with one another and with nonionic emulsifiers. The same also applies to cationic emulsifiers, whereas anionic and cationic emulsifiers are mostly not compatible with one another. Examples of customary emulsifiers are ethoxylated mono-, di- and trialkylphenols (EO level: 3 to 50, alkyl radical: $C_4$ to $C_{12}$), ethoxylated fatty alcohols (EO level: 3 to 50; alkyl radical: $C_8$ to $C_{36}$), and alkali metal and ammonium salts of alkyl sulfates (alkyl radical: $C_8$ to $C_{12}$), of sulfuric hemiesters of ethoxylated alkanols (EO level: 4 to 30, alkyl radical: $C_{12}$ to $C_{18}$) and ethoxylated alkylphenols (EO level: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to $C_{18}$). Further suitable emulsifiers can be found in Houben-Weyl, Methoden der organischen Chemie [Methods of organic chemistry], vol. XIV/1, Makromolekulare Stoffe [Macromolecular substances], pages 192-208, Georg-Thieme-Verlag, Stuttgart, 1961.

Further suitable surface-active substances have been found to be compounds of the general formula I

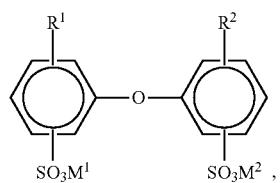

in which $R^1$ and $R^2$ are hydrogen atoms or $C_4$ to $C_{24}$ alkyl and are not both hydrogen atoms, and $M^1$ and $M^2$ may be alkali metal ions and/or ammonium ions. In the general formula (I), $R^1$ and $R^2$ are preferably linear or branched alkyl radicals having 6 to 18 carbon atoms, in particular having 6, 12 or 16 carbon atoms, or hydrogen, where $R^1$ and $R^2$ are not both simultaneously hydrogen atoms. $M^1$ and $M^2$ are preferably sodium, potassium or ammonium, with sodium particularly preferred. Particularly advantageous are compounds (I) in which $M^1$ and $M^2$ are sodium, $R^1$ is a branched alkyl radical having 12 carbon atoms and $R^2$ is a hydrogen atom or $R^1$. Technical grade mixtures containing 50% to 90% by weight of the monoalkylated product, for example Dowfax® 2A1 (brand of Dow Chemical Company), are commonly used. The compounds (I) are common knowledge, for example from U.S. Pat. No. 4,269,749, and are commercially available.

Optionally, nonionic and/or anionic dispersing aids are advantageously used in the preparation of the dispersion polymers P by free-radical-initiated aqueous emulsion polymerization. The use of cationic dispersing aids is however also possible.

The amount of optionally used dispersion aid is generally 0.1% to 5% by weight, preferably 1% to 3% by weight, in each case based on the total amount of monomers P. It is often advantageous if some or all of the dispersing aid is added to the aqueous reaction medium prior to initiation of the free-radical polymerization. In addition, it may also be advantageous to add some or all of the dispersing aid to the reaction medium together with the monomers, particularly in the form of an aqueous monomer emulsion, during the polymerization. In the process according to the invention, it is however particularly advantageous to use none of the optional dispersing aids.

Free-radical chain-transfer compounds may be used in order to reduce or to control the molecular weight of the dispersion polymers P obtainable by a free-radical-initiated aqueous emulsion polymerization. The compounds that may be used for this are largely aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols, such as benzenethiol, ortho-, meta-, or para-methylbenzenethiol, and all other sulfur compounds described in "Polymerhandbook" [Polymer handbook], 3rd edition, 1989, J. Brandrup and E. H. Immergut, John Wiley & Sons, section II, pages 133-141, but also aliphatic and/or aromatic aldehydes, such as acetaldehyde, propionaldehyde, and/or benzaldehyde, unsaturated fatty acids, such as oleic acid, dienes having non-conjugated double bonds, such as divinylmethane or vinylcyclohexane, or hydrocarbons having easily abstractable hydrogen atoms, such as toluene. Alternatively, it is optionally also possible to use mixtures of the abovementioned free-radical chain-transfer compounds that do not interfere with one another.

The total amount of free-radical chain-transfer compounds optionally used in the preparation of the dispersion polymers P by free-radical-initiated aqueous emulsion polymerization is generally <5% by weight, often <3% by weight and commonly <1% by weight, in each case based on the total amount of monomers P.

As well as the seed-free mode of preparation, adjustment of the polymer particle size is possible by carrying out the emulsion polymerization for preparation of the dispersion polymers P according to the seed latex process or in the presence of a seed latex produced in situ. Such processes are known to those skilled in the art and can be found in the prior art (see e.g. EP-B 40 419, EP-A 567 812, EP-A 614 922 and "Encyclopedia of Polymer Science and Technology", vol. 5, page 847, John Wiley & Sons Inc., New York, 1966). For instance, in the semicontinuous feed process, the prior art recommends initially charging the polymerization vessel with a defined, finely divided seed polymer dispersion and then polymerizing the monomers P in the presence of the seed latex. The seed polymer particles act here as "polymerization nuclei" and decouple polymer particle formation and polymer particle growth. During the emulsion polymerization, it is possible to add further seed latex directly to the polymerization reactor. This achieves broad size distributions of the polymer particles, which are often desirable especially in the case of polymer dispersions having a high solids content (see e.g. DE-A 4213965). Alternatively, instead of adding a defined seed latex, this can also be produced in situ. This can be done, for example, by initially charging a portion of the monomers used for the polymerization and of the free-radical initiator together with some or all of the emulsifier and heating this to reaction temperature, resulting in the formation of a relatively finely divided polymer seed. The actual polymerization is then carried out by the feed method in the same polymerization vessel (see also DE-A 4213965). It is however advantageous in accordance with the invention to use no seed latex.

The dispersion polymers P are advantageously prepared by free-radical-initiated aqueous emulsion polymerization at a reaction temperature in the range from 0 to 170° C., but with particular preference given to temperatures from 70 to 120° C. and from 80 to 100° C. in particular. The free-radical aqueous emulsion polymerization may be carried out at a pressure of less than, equal to or greater than 1 atm (absolute). Volatile monomers such as ethylene, butadiene or vinyl chloride are preferably polymerized at elevated pressure. The pressure in the polymerization may be 1.2, 1.5, 2, 5, 10, 15 bar (overpressure) or even higher. If emulsion polymerizations are carried out at reduced pressure, pressures of 950 mbar, commonly of 900 mbar, and often 850 mbar (absolute) are set. The free-radical aqueous emulsion polymerization is advantageously carried out at 1 atm (=atmospheric pressure=1.013 bar absolute) under an inert gas atmosphere, for example under nitrogen or argon.

In the free-radical-initiated aqueous emulsion polymerization, the aqueous reaction medium may in principle also comprise minor amounts (<5% by weight) of water-soluble organic solvents, such as methanol, ethanol, isopropanol, butanols, pentanols, but also acetone, etc. In accordance with the invention, it is however preferable for the free-radical-initiated aqueous emulsion polymerization to be carried out in the absence of such solvents.

In accordance with the invention, the type and amount of the at least one monomer P are chosen such that the dispersion polymer P obtained has a glass transition temperature Tg measured in accordance with DIN EN ISO 11357-2 (2013-09) in the range $\geq -30$ and $\leq 90°$ C. If the dispersion polymer P is to be used as a binder in pigment-containing coating formulations, the type and amount of the monomers P used in each case are chosen such that the dispersion polymer P has a glass transition temperature Tg in the range $\geq -20$ and $\leq 80°$ C. and particularly advantageously in the range $\geq 10$ and $\leq 70°$ C. If, on the other hand, the dispersion polymer P is to be used as a binder in pigment-free clearcoats, the type and amount of the monomers P used in each case are chosen such that the dispersion polymer P has a glass transition temperature Tg in the range $\geq -10$ and $\leq 80°$ C. and particularly advantageously in the range $\geq -5$ and $\leq 65°$ C.

In the context of this document, the glass transition temperature Tg is understood as meaning the midpoint temperature according to DIN EN ISO 11357-2 (2013-09), determined by differential thermal analysis [see also Ullmann's Encyclopedia of Industrial Chemistry, page 169, Verlag Chemie, Weinheim, 1992, and Zosel in Farbe and Lack [Paint and varnish], 82, pages 125-134, 1976].

A further important point is that, according to Fox (T. G. Fox, Bull. Am. Phys. Soc. 1956 [Ser. II] 1, page 123 and according to Ullmann's Encyclopädie der technischen Chemie [Ullmann's Encyclopedia of Industrial Chemistry], vol. 19, page 18, 4th edition, Verlag Chemie, Weinheim, 1980), the glass transition temperature of at most lightly crosslinked mixed copolymers can be estimated in a good approximation by the following equation:

$$1/Tg = x_1/Tg^1 + x_2/Tg^2 + \ldots x_n/Tg^n,$$

where $x_1, x_2, \ldots x_n$ are the mass fractions of the monomers 1, 2, ... n and $Tg^1, Tg^2, \ldots Tg^n$ are the glass transition temperatures in degrees kelvin of the homopolymers formed from in each case just one of the monomers 1, 2, ... n. The glass transition temperatures of these homopolymers are known for most ethylenically unsaturated monomers (or may be determined experimentally in a simple manner known per se) and are listed for example in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

The aqueous polymer dispersions obtainable by the process according to the invention normally have a total polymer solids content (sum of the amounts of copolymer A and dispersion polymer P) of $\geq 10\%$ and $\leq 70\%$ by weight, commonly $\geq 20\%$ and $\leq 65\%$ by weight, and often $\geq 25\%$ and $\leq 60\%$ by weight, in each case based on the aqueous polymer dispersion.

Particularly advantageously, the dispersion polymers P are in the form of particles having an average particle diameter $\geq 10$ and $\leq 1000$ nm, advantageously $\geq 20$ and $\leq 200$ nm, and more advantageously $\geq 20$ to $\leq 100$ nm, determined by the method of quasielastic light scattering (ISO standard 13 321; cumulant z-average).

In accordance with the invention, it is important that the ratio of the amounts by weight of copolymer A to the at least one monomer P used to prepare the dispersion polymer P (total amount of monomers P) is in the range $\geq 15$ and $\leq 60$ to $\geq 40$ and $\leq 85$, advantageously in the range $\geq 20$ and $\leq 50$ to $\geq 50$ and $\leq 80$, and particularly advantageously in the range $\geq 25$ and $\leq 45$ to $\geq 55$ and $\leq 75$.

It is understood that the aqueous polymer dispersions obtainable by the process according to the invention and the polymer powders obtainable by the drying thereof are also provided in a preferred embodiment. The production of polymer powders by drying aqueous polymer dispersions is familiar to those skilled in the art and is carried out for example by freeze drying or spray drying.

It is important that the aqueous polymer dispersions prepared by the process according to the invention are characterized by high stability and low coagulate formation and additionally have high transparency.

It is also important that the aqueous polymer dispersions obtainable by the process according to the invention and the polymer powders obtainable therefrom by drying can be advantageously used as a binder in the production of adhesives, sealants, synthetic resin renders, paper coating slips, fiber nonwovens, flexible roof coatings, printing inks, and coating materials and also in sand consolidation, as a component in the production of textile or leather auxiliaries and impact modifiers, or for modification of mineral binders and plastics.

The aqueous polymer dispersions according to the invention or the polymer powders according to the invention can advantageously be employed in aqueous formulations used as binders in coating formulations. In one embodiment according to the invention, these aqueous formulations also comprise at least one pigment, which means that the invention is also to encompass aqueous formulations that comprise an aqueous polymer dispersion according to the invention or a corresponding polymer powder and also at least one pigment.

If the abovementioned aqueous formulations comprising an aqueous polymer dispersion according to the invention or polymer powders thereof are used in the preparation of aqueous coating formulations, said aqueous formulations may additionally comprise pigments and/or fillers in addition to customary constituents familiar to those skilled in the art, such as organic solvents, coalescing agents, dispersing aids, neutralizing agents, defoamers, thickeners, leveling agents, and bactericidal or fungicidal auxiliaries.

Pigments used may in principle be all white or color pigments familiar to those skilled in the art. According to CD Römpp Chemie Lexikon [Chemistry Lexicon]—version 1.0, Stuttgart/New York: Georg Thieme Verlag 1995 with reference to DIN 55943, pigments are understood as meaning particulate inorganic or organic, colored or uncolored colorants that are practically insoluble in the application medium.

Pigments that may advantageously be used include all organic and/or inorganic white or color pigments familiar to those skilled in the art having a particle size ≤15 µm measured in accordance with ISO 1524 using a Hegmann grindometer.

Titanium dioxide in its various polymorphs should be mentioned as the most important white pigment on account of its high refractive index (rutile: 2.70 and anatase: 2.55) and its good hiding power. However, zinc oxide and zinc sulfide are also used as white pigments. These white pigments may be used in coated or uncoated form. Organic white pigments such as non-film-forming hollow polymer particles rich in styrene and carboxyl groups and having a particle size of approx. 300 to 400 nm (so-called opaque particles) are however also used.

In addition to white pigments, a wide variety of color pigments familiar to those skilled in the art may be used for coloring purposes, for example the relatively inexpensive inorganic oxides and sulfides of iron, cadmium, chromium, and lead, lead molybdate, cobalt blue or carbon black, and the somewhat more costly organic pigments, for example phthalocyanines, azo pigments, quinacridones, perylenes or carbazoles.

In addition to pigments, the aqueous formulations may of course also comprise so-called fillers familiar to those skilled in the art. Fillers are to be understood as meaning largely pulverulent inorganic materials having a particle size ≤20 µm (according to Hegmann) and having a relatively low refractive index compared to the pigments (according to DIN 55943 and DIN 55945 white fillers have refractive index values <1.7). The pulverulent fillers used here are commonly naturally occurring minerals, such as calcite, chalk, dolomite, kaolin, talc, mica, diatomaceous earth, baryte, quartz or talc/chlorite assemblages, but also synthetically produced inorganic compounds, such as precipitated calcium carbonate, calcined kaolin or barium sulfate, and fumed silica. The filler used is preferably calcium carbonate in the form of crystalline calcite or of amorphous chalk.

In one embodiment, the aqueous formulations also comprise at least one organic solvent that advantageously acts as a film-forming auxiliary. Suitable examples thereof include aromatic hydrocarbons such as solvent naphtha, benzene, toluene, xylene, or mixtures of aromatic hydrocarbons, such as those marketed as Solvesso® 100, 150 or 200, chlorobenzene, esters, such as ethyl acetate, butyl acetate, methyl glycol acetate, ethyl glycol acetate, methoxypropyl acetate, 2,2,4-trimethyl-1,3-pentanediol monoisobutyrate (Texanol® from Eastman), dipropylene glycol monomethyl ether acetate, propylene glycol monoethyl ether acetate, propylene glycol monomethyl ether acetate, ethers, such as butyl glycol, tetrahydrofuran, dioxane, ethyl glycol ether, diethylene glycol monoethyl ether, diethylene glycol monomethyl ether, diethylene glycol mono-n-butyl ether, diethylene glycol mono-n-hexyl ether, diethylene glycol diethyl ether, diethylene glycol dimethyl ether, diethylene glycol di-n-butyl ether, diethylene glycol di-n-hexyl ether, ethylene glycol di-2-ethylhexyl ether, ethylene glycol di-n-butyl ether, ethylene glycol di-n-hexyl ether, ethylene glycol di-n-propyl ether, dipropylene glycol dimethyl ether, dipropylene glycol monomethyl ether, dipropylene glycol mono-n-butyl ether, dipropylene glycol mono-n-propyl ether, dipropylene glycol mono-tert-butyl ether, dipropylene glycol di-tert-butyl ether, propylene glycol monoethyl ether, propylene glycol monomethyl ether, propylene glycol mono-n-propyl ether, propylene glycol monophenyl ether, propylene glycol mono-tert-butyl ether, propylene glycol diphenyl ether, propylene glycol mono-n-butyl ether, tripropylene glycol monomethyl ether and poly(allyl glycidyl ether), ketones, such as acetone, methyl ethyl ketone, halogenated organic solvents, such as methylene chloride or trichloromonofluoroethane, or other organic solvents such as benzyl alcohol, dibutyl phthalate, propylene glycol, and tris(butoxyethyl) phosphate.

Film-forming auxiliaries are used especially in order to lower the minimum film-forming temperature (MFFT) of the dispersion polymers and hence to contribute to good film formation. In the context of this document, the MFFT is understood as meaning the temperature determined experimentally in accordance with DIN ISO 2115 of April 2001, below which the aqueous polymer dispersion does not form a continuous polymer film.

If, in addition to the aqueous polymer dispersion according to the invention or polymer powder thereof, the aqueous formulations additionally comprise at least one pigment or filler, then these advantageously have a pigment volume concentration of ≥1 and ≤60%, advantageously ≥5 and ≤50%, and more advantageously ≥10 and ≤40%. Pigment volume concentration (PVC) is understood here as meaning the volume of the pigments and fillers multiplied by 100, divided by the volume of the binder polymer plus the volume of the pigments and fillers.

$$\% \ PVC = \frac{\text{Volume of the pigments and fillers}}{\text{Volume of the binder polymer} + \text{Volume of the pigments and fillers}}$$

If, however, in addition to the aqueous polymer dispersion according to the invention or polymer powder thereof, the aqueous formulations do not comprise any pigments, fillers or other solids, then said formulation is generally clear and translucent as a consequence of the small particle size of the dispersion polymers P, which is the reason for their high degree of transparency when wet and their resultant advantageous suitability for clearcoats in particular.

It is advantageous when the aqueous formulations, especially coating compositions that do not comprise film-forming auxiliaries, are first applied to the surface of a substrate and then dried at a temperature T equal to or greater than the minimum film-forming temperature (MFFT) [T≥MFFT] of the aqueous polymer dispersion of the invention or aqueous formulation thereof. The drying temperature is advantageously T≥(MFFT+5)° C., more advantageously T≥(MFFT+10) ° C., and particularly advantageously T≥(MFFT+20) ° C.

It is important in accordance with the invention that the amount of aqueous formulation is chosen such that the coating applied to the substrate surface has, after drying, a layer thickness of ≤2 mm, advantageously ≥0.01 and ≤1.5 mm, and more advantageously ≥0.02 and ≤0.5 mm. It is of course possible in accordance with the invention for two or more identical or different coating layers to be applied successively to a substrate.

In accordance with the invention, all natural or synthetic, organic or inorganic substrates may be coated with the aqueous formulation. However, in a preferred embodiment, the aqueous formulations according to the invention are suitable for coating substrates that have a hydrophilic surface, such as metal, glass, porcelain, paper, paperboard, plastics, concrete or wood.

In the context of the present document, a substrate is defined as having a hydrophilic surface when, at a temperature of 20° C. and atmospheric pressure (1.013 bar absolute), the contact angle of a droplet of deionized water applied to a horizontal flat surface of a substrate, immediately after application thereof, forms a contact angle <90° with the surface of the substrate [interfacial tension of the substrate with respect to the environment is greater than the interfacial tension of water with respect to the environment].

It is also important that the aqueous formulations of the invention are suitable in particular for the production of coatings having high solvent stability and low tendency to soiling/high resistance to staining.

The present invention accordingly comprises the following embodiments:

1.) A process for preparing an aqueous polymer dispersion through free-radical-initiated emulsion polymerization, wherein at least one ethylenically unsaturated compound (monomer P) undergoes free-radical polymerization in the presence of a copolymer A in an aqueous medium, wherein a) the copolymer A is formed in copolymerized form from

| | |
|---|---|
| ≥10% and ≤50% | by weight of at least one α,β-monoethylenically unsaturated $C_3$ to $C_6$ monocarboxylic acid (monomers A1), |
| ≥50% and ≤90% | by weight of at least one other monoethylenically unsaturated compound (monomers A2), | wherein the amounts of monomers A1 and A2 add up to 100% by weight (total amount of monomers A) and wherein the copolymer A has a weight-average molecular weight in the range ≥5000 and ≤20 000 g/mol, the type and amounts of monomers A1 and A2 are chosen such that the copolymer A obtained has a glass transition temperature Tg measured according to DIN EN ISO 11357-2 (2013-09) in the range ≥70° C. and wherein before the addition and the free-radical polymerization of the at least one monomer P, the copolymer A is reacted in an aqueous medium with a metal compound M, selected from the group comprising oxides, hydroxides, carbonates or hydrogen carbonates of magnesium, calcium or zinc, and a base B that differs from the metal compound M, such that ≥50 mol % of the carboxyl groups present in copolymer A have been neutralized by the base B, and the amount of the metal compound M is 0.01% to 5% by weight based on the amount of copolymer A, b) the type and amount of the at least one monomer P are chosen such that the dispersion polymer P obtained has a glass transition temperature Tg measured in accordance with DIN EN ISO 11357-2 (2013-09) in the range ≥−30 and ≤90° C., and wherein c) the ratio of the amounts by weight of copolymer A to the at least one monomer P used to prepare the dispersion polymer P is in the range ≥15 and ≤60 to ≥40 and ≤85.

2.) The process for preparing an aqueous polymer dispersion according to embodiment 1, wherein the copolymer A comprises in copolymerized form as monomer A2

| | |
|---|---|
| ≥25% and ≤90% | by weight of at least one monoethylenically unsaturated aromatic compound (monomers A2-1) and |
| ≥0% and ≤65% | by weight of at least one other monoethylenically unsaturated compound that differs from monomers A1 and A2-1 (monomers A2-2), | based on the total amount of monomers A, wherein the amounts of monomers A2-1 and A2-2 add up to a minimum of 50% by weight and a maximum of 90% by weight of the total amount of monomers A.

3.) The process for preparing an aqueous polymer dispersion according to embodiment 2, wherein copolymer A comprises in copolymerized form acrylic acid and/or methacrylic acid as monomers A1, styrene and/or α-methylstyrene as monomers A2-1, and methyl methacrylate, n-butyl acrylate and/or 2-ethylhexyl acrylate as monomers A2-2.

4.) The process for preparing an aqueous polymer dispersion according to any of embodiments 1 to 3, wherein copolymer A comprises in copolymerized form

| | |
|---|---|
| ≥10% and ≤45% | by weight of acrylic acid, |
| ≥25% and ≤65% | by weight of styrene, |
| ≥0% and ≤40% | by weight of α-methylstyrene, and |
| ≥0% and ≤65% | by weight of methyl methacrylate, n-butyl acrylate and/or 2-ethylhexyl acrylate. |

5.) The process for preparing an aqueous polymer dispersion according to any of embodiments 1 to 4, wherein an organic or inorganic basic compound having a boiling point ≤110° C. at 1.013 bar (absolute) is used as base B.

6.) The process for preparing an aqueous polymer dispersion according to any of embodiments 1 to 5, wherein ammonium hydroxide and/or an organic amine is used as base B.

7.) The process for preparing an aqueous polymer dispersion according to any of claims 1 to 6, wherein calcium hydroxide and/or zinc oxide is used as metal compound M.

8.) The process for preparing an aqueous polymer dispersion according to any of embodiments 1 to 7, wherein ≥70 mol-% of the carboxyl groups present in the copolymer A are neutralized by the base B.

9.) The process for preparing an aqueous polymer dispersion according to any of embodiments 1 to 8, wherein the amount of the metal compound M is 0.1% to 1.0% by weight based on the amount of copolymer A.

10.) The process for preparing an aqueous polymer dispersion according to any of embodiments 1 to 9, wherein, according to the process, no dispersing aids (surfactants and/or protective colloids) are used.

11.) An aqueous polymer dispersion obtainable by a process according to any of embodiments 1 to 10.

12.) A polymer powder obtainable by drying an aqueous polymer dispersion according to embodiment 11.

13.) The use of an aqueous polymer dispersion according to embodiment 11 or of a polymer powder according to embodiment 12 as a binder in the production of adhesives, sealants, synthetic resin renders, paper coating slips, fiber nonwovens, flexible roof coatings, printing inks, and coating materials and also in sand consolidation, as a component in the production of textile or leather auxiliaries and impact modifiers, or for modification of mineral binders and plastics.

14.) An aqueous formulation comprising an aqueous polymer dispersion according to embodiment 11 or a polymer powder according to embodiment 12 and at least one pigment and/or filler.
15.) The aqueous formulation according to embodiment 14 having a pigment volume concentration in the range ≥1% and ≤60%.

The invention is elucidated with reference to the nonlimiting examples hereinbelow.

EXAMPLES

The aqueous coating formulation was prepared using a copolymer A prepared in accordance with the procedure disclosed in U.S. Pat. No. 4,529,787 from a mixture of the following monomers A1 and A2: 10.8% by weight of acrylic acid, 27.8% by weight of styrene, 47.3% by weight of methyl methacrylate, and 14.1% by weight of n-butyl acrylate. The copolymer A obtained in the form of powder flakes had a weight-average molecular weight of 9150 g/mol, a glass transition temperature of 81° C., and an acid value of 77 mg KOH/g of polymer.

The weight-average molecular weight thereof was determined by gel-permeation chromatography. The eluent used was a mixture of tetrahydrofuran and 0.1% by weight of trifluoroacetic acid. Separation was on a "PLgel MIXED-B" column from Agilent. Calibration was performed using narrowly distributed polystyrene standards from Polymer Laboratories having molecular weights from M=580 to M 6 870 000 g/mol and hexylbenzene (M=162 g/mol). Values outside this elution range were extrapolated. Detection was at 254 nm using the "DRI Agilent 1100 UV Agilent 1100 VWD" detector from Agilent.

In the context of this document, the glass transition temperature Tg was generally determined in accordance with DIN EN ISO 11357-2 (2013-09) by differential scanning calorimetry (DSC) with a heating rate of 20 K/min using a DSC 02000 instrument from TA Instruments. The determination here was based on the midpoint temperatures.

The acid value of the copolymer A was calculated taking into account the corresponding molar masses of the monomers and the theoretical composition of the polymer.

Preparation of the Copolymer A Solutions
Inventive Copolymer A Solution (Copolymer A Solution)

A reaction vessel was initially charged at room temperature with 680.2 parts by weight of deionized water, 0.62 parts by weight of powdered calcium hydroxide, and 300.0 parts by weight of powdered copolymer A and then 23.44 parts by weight of a 25% by weight aqueous ammonia solution was metered in over a period of 10 minutes with stirring. The reaction mixture obtained was stirred at room temperature for a further 30 minutes, then heated to 80° C. with stirring and stirred at this temperature for 2 hours, resulting in the complete dissolution of the copolymer A. The copolymer A solution, which showed only slight turbidity, was then cooled to room temperature. The copolymer A solution obtained had a solids content of 29.7% by weight and a pH of 7.9.

In the context of this document, the solids contents were generally determined by drying a defined amount of the aqueous polymer dispersion (about 0.8 g) to constant weight at a temperature of 130° C. using a Mettler Toledo HR73 moisture analyzer. Two measurements are in each case carried out and the average of these two measurements is reported.

In the context of this document, the pH is generally determined at room temperature using a calibrated InPro® 325X pH electrode from Mettler-Toledo GmbH.

Comparative Copolymer A Solution (Copolymer CA Solution)

The copolymer CA solution was prepared in completely analogous manner to the preparation of the copolymer A solution, except that no calcium hydroxide was used. The copolymer CA solution obtained had a solids content of 29.9% by weight and a pH of 7.7.

Preparation of Aqueous Polymer Dispersions
Inventive Aqueous Polymer Dispersion P A polymerization vessel equipped with metering devices and temperature control was initially charged at room temperature under a nitrogen atmosphere with

| 317.9 g | deionized water |
| 480.5 g | copolymer solution | and heated to 80° C. with stirring. On reaching this temperature,

| 30.9 g | of a 7% by weight aqueous solution of ammonium peroxodisulfate | was added and the mixture was stirred for 5 minutes while maintaining this temperature. Feed 1 was then metered in continuously over a period of 120 minutes at a uniform addition rate. At the end of feed 1, feed 2 was added (rinsing the feed line with feed 2) and the resulting reaction mixture subjected to further polymerization for 60 minutes.

Feed 1 (Homogeneous Mixture of):

| 216.2 g | styrene |
| 62.5 g | n-butyl acrylate |
| 57.7 g | 2-ethylhexyl acrylate |

Feed 2:

| 25.00 g | deionized water |

At the end of the further polymerization time, the aqueous polymer dispersion obtained was cooled to room temperature, 0.5 g of a 5% by weight aqueous solution of Acticid® MBS (a biocide from Thor GmbH), 14.8 g of deionized water, and 2.9 g of a 25% by weight aqueous ammonia solution were added, and the mixture was filtered through a 125 μm filter.

The aqueous polymer dispersion obtained had a solids content of 40.2% by weight and a pH of 8.3. The weight-average particle diameter was 53 nm. Filtration through the 125 μm filter afforded an amount of coagulate corresponding to 0.01% by weight based on the solids content of the aqueous polymer dispersion obtained. No gel formation was observed in the reaction vessel either.

In the context of this document, the weight-average particle diameter was generally determined in accordance with ISO 13321 using a Malvern High Performance Particle Sizer at 22° C. and a wavelength of 633 nm.

Comparative Aqueous Polymer Dispersion CP1

The comparative polymer dispersion CP1 was prepared in completely analogous manner to the preparation of the aqueous polymer dispersion P of the invention, except that the same amount of copolymer CA solution was used instead of the copolymer A solution.

The resulting aqueous comparative polymer dispersion CP1 had a solids content of 40.2% by weight and a pH of 8.2. The weight-average particle diameter was 51 nm. Filtration through the 125 μm filter afforded an amount of coagulate corresponding to 0.01% by weight based on the solids content of the aqueous polymer dispersion obtained. No gel formation was observed in the reaction vessel either.

Aqueous Comparative Polymer Dispersion CP2

100.0 g of a comparative polymer dispersion CP1 filtered through a 45 μm filter was mixed at room temperature in a glass vessel, with stirring, with 0.12 g of a 20% by weight aqueous calcium hydroxide slurry over a period of 10 minutes and stirring was continued for a further 30 minutes. The resulting comparative polymer dispersion CP2 was then filtered through a 45 μm filter, affording 0.6 g of coagulate (corresponding to 1.5% by weight based on the total solids content). The formation of coagulate or gel particles was also observed on the stirrer and on the surface of the glass vessel.

Preparation and Performance Testing of the Varnish Formulations

For the preparation of the varnish formulations, the aqueous polymer dispersion P and the comparative dispersions CP1 and CP2 were adjusted to a solids content of 39.0% by weight through addition of deionized water to the stirred dispersions.

In each case, 150 g of the aqueous (comparative) polymer dispersions thus obtained was then initially charged at room temperature. To the initially charged aqueous (comparative) polymer dispersions were then in each case successively added, with stirring, 0.7 g of FoamStar® SI 2180 from BASF SE as defoamer and 0.4 g of Rheovis® PU 1250 from BASF SE as thickener.

To these mixtures was then in each case added, with stirring, 12.2 g of ethylene glycol butyl ether as a film-forming aid. Where necessary, the respective varnish formulations were then adjusted to a pH of 8.0 to 8.2 with a 10% by weight aqueous ammonia solution. The varnish formulations thus obtained were stirred for a further 5 minutes. Before undergoing the performance tests, the varnish formulations thus obtained were left to stand for at least 1 hour. The aqueous coating formulations thus obtained from the aqueous polymer dispersion P and from the comparative polymer dispersions CP1 and CP2 are referred to hereinbelow as varnishes VP (inventive) and CVP1 and CVP2 (non-inventive).

Performance Tests:

Testing of chemical resistances and resistance to staining was carried out on test boards that had been coated with the varnishes prepared. For this purpose, beech test boards (veneered) were coated with the respective varnish VP and also CVP1 and CVP2 using a bar applicator in a layer thickness of 150 μm (wet). The test boards were then dried under standard climatic conditions (23° C. and 50% relative humidity) for 30 days. Testing of chemical resistances and resistance to staining was carried out in accordance with DIN 68861-1. This was done by placing filter papers (diameter: 3 cm; basis weight: 500 g/m²) soaked in the test liquids on the surface to be tested. To suppress evaporation, small plastic beakers having an internal diameter of 3.5 cm and a height of 1.5 cm were placed over the filter papers. The test liquids used were acetone, blackcurrant juice, and deionized water. The filter papers soaked in deionized water, blackcurrant juice, and acetone were then applied to the varnished test boards at room temperature. The exposure time of the filter paper soaked in acetone was 10 seconds, whereas that of the filter paper soaked in deionized water and in blackcurrant juice was 16 hours. For each varnish, 3 filter papers soaked in the different test liquids were in each case used. The change in the respective varnish was visually assessed after removing the soaked filter paper. The visual assessment was based on the following assessment/grading system:

| | |
|---|---|
| No visible changes in gloss and color; the structure of the test area is unchanged: | Grade 5 |
| Changes in gloss and color just about detectable; the structure of the test area is unchanged: | Grade 4 |
| Slight changes in gloss and color; the structure of the test area is unchanged: | Grade 3 |
| Significant changes in gloss and color; the structure of the test area is unchanged: | Grade 2 |
| Significant changes in gloss and color; the structure of the test area is changed: | Grade 1 |
| Significant changes in gloss and color; the structure of the test area is significantly changed: | Grade 0 |

The results obtained with the respective varnishes VP, CVP1, and CVP2 are summarized in Table 1 below.

In a further experiment, the respective varnishes VP, CVP1, and CVP2 were applied with a bar applicator to a glass plate in a layer thickness of 150 μm (wet) and dried for 48 hours at room temperature. The number of defects, termed "specks", on an area of 9 cm² was then counted visually (against a white background). For this, three independent assessments were in each case carried out. The corresponding results—obtained as the mean of the three assessments—are also shown in Table 1. The lower the number of specks, the better the assessment of a varnish.

TABLE 1

Results of the performance tests

| Varnish | Water | Staining Blackcurrant juice | Acetone | Number of specks |
|---|---|---|---|---|
| VP | 4 | 4 | 2 | 17 |
| CVP1 | 3 | 3 | 0 | 11 |
| CVP2 | 3 | 2 | 2 | 150 |

The results show clearly that the varnish formulation VP prepared from the aqueous polymer dispersion P of the invention has good to very good resistance to staining and a low number of specks. By contrast, although the calcium hydroxide-free varnish formulation has good resistance to staining by water and blackcurrant juice and a low number of specks, resistance to staining by acetone declines sharply. The coating formulation CVP2, in which the calcium ions are added after preparation of the aqueous comparative polymer dispersion CP1, also shows good or acceptable resistance to staining by water, blackcurrant juice, and acetone, but the number of specks is not acceptable. Moreover, coagulate formation caused by addition of calcium hydroxide to the aqueous polymer dispersion after the polymerization is not acceptable.

The invention claimed is:

1. A process for preparing an aqueous polymer dispersion, the process comprising:

forming a copolymer A from at least one α,β-monoethylenically unsaturated $C_3$ to $C_6$ monocarboxylic acid (monomers A1) and at least one other monoethylenically unsaturated compound (monomers A2);

reacting the copolymer A with a metal compound M in an aqueous medium to modify copolymer A; and conducting free-radical polymerization of at least one ethylenically unsaturated compound (monomer P) in the presence of the modified copolymer A in an aqueous medium, wherein a) the copolymer A is formed in copolymerized form from
≥10% and ≤50% by weight of the monomers A1, and
≥50% and ≤90% by weight of the monomers A2,
wherein amounts of monomers A1 and A2 add up to 100% by weight (total amount of monomers A) and wherein
the copolymer A has a weight-average molecular weight in a range of ≥5000 and ≤20 000 g/mol,
the monomers A1 and A2 are chosen such that the copolymer A has a glass transition temperature Tg measured according to DIN EN ISO 11357-2 (2013-09) in a range of ≥70° C. and wherein
the metal compound M is selected from the group consisting of an oxide, a hydroxide, a carbonate or a hydrogen carbonate of magnesium, calcium or zinc, and used in combination with a base B that differs from the metal compound M, such that
≥50 mol % of carboxyl groups present in the copolymer A are neutralized by the base B, and
an amount of the metal compound M is 0.01% to 5% by weight based on an amount of the copolymer A, b) the at least one monomer P is chosen such that the dispersion polymer P has a glass transition temperature Tg measured in accordance with DIN EN ISO 11357-2 (2013-09) in a range of ≥−30 and ≤90° C., and wherein c) a ratio of the amounts by weight of copolymer A to the at least one monomer P used to prepare the dispersion polymer P is in a range of ≥15 and ≤60 to ≥40 and ≤85.

2. The process according to claim 1, wherein the copolymer A comprises in copolymerized form as monomers A2:
≥25% and ≤90% by weight of at least one monoethylenically unsaturated aromatic compound (monomers A2-1) and
≥0% and ≤65% by weight of at least one other monoethylenically unsaturated compound that differs from monomers A1 and A2-1 (monomers A2-2),
based on the total amount of monomers A, wherein amounts of monomers A2-1 and A2-2 add up to a minimum of 50% by weight and a maximum of 90% by weight of the total amount of monomers A.

3. The process according to claim 2, wherein the copolymer A comprises in copolymerized form acrylic acid and/or methacrylic acid as monomers A1, styrene and/or α-methylstyrene as monomers A2-1, and methyl methacrylate, n-butyl acrylate and/or 2-ethylhexyl acrylate as monomers A2-2.

4. The process for preparing an aqueous polymer dispersion according to claim 1, wherein the copolymer A comprises in copolymerized form:
≥10% and ≤45% by weight of acrylic acid,
≥25% and ≤65% by weight of styrene,
≥0% and ≤40% by weight of α-methylstyrene, and
≥0% and ≤65% by weight of methyl methacrylate, n-butyl acrylate and/or 2-ethylhexyl acrylate.

5. The process according to claim 1, wherein the base B is an organic or inorganic basic compound having a boiling point ≤110° C. at 1.013 bar (absolute).

6. The process according to claim 1, wherein the base B is ammonium hydroxide and/or an organic amine.

7. The process according to claim 1, wherein the metal compound M is calcium hydroxide and/or zinc oxide.

8. The process according to any claim 1, the process furtherer comprising neutralizing ≥70 mol-% of the carboxyl groups present in the copolymer A by the base B.

9. The process according to claim 1, wherein the amount of the metal compound M is 0.1% to 1.0% by weight based on the amount of copolymer A.

10. The process according to claim 1, wherein no dispersing aids (surfactants and/or protective colloids) are used.

11. An aqueous polymer dispersion obtained by the process according to claim 1.

12. A polymer powder obtained by drying an aqueous polymer dispersion according to claim 11.

13. An article comprising the aqueous polymer dispersion according to claim 11 wherein the article is selected from the group consisting of an adhesive, a sealant, a synthetic resin render, a paper coating slip, a fiber nonwoven, a flexible roof coating, a printing ink, a coating material, a textile or leather auxiliary, an impact modifier, a mineral binder and a plastic.

14. An aqueous formulation comprising:
the aqueous polymer dispersion according to claim 11 and
at least one pigment and/or filler.

15. The aqueous formulation according to claim 14 having a pigment volume concentration in a range of ≥1% and ≤60%.

* * * * *